(12) United States Patent
Fujikubo et al.

(10) Patent No.: US 11,820,454 B2
(45) Date of Patent: Nov. 21, 2023

(54) STRADDLE-TYPE ELECTRIC VEHICLE

(71) Applicant: HONDA MOTOR CO., LTD., Tokyo (JP)

(72) Inventors: Makoto Fujikubo, Wako (JP); Katsuhiko Sato, Wako (JP); Tsugio Ikeda, Wako (JP); Ryo Kubota, Wako (JP); Yudai Hirose, Wako (JP); Naoya Ishimatsu, Wako (JP); Hiroshi Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 508 days.

(21) Appl. No.: 17/029,783

(22) Filed: Sep. 23, 2020

(65) Prior Publication Data

US 2021/0001947 A1   Jan. 7, 2021

Related U.S. Application Data

(63) Continuation of application No. PCT/JP2018/013421, filed on Mar. 29, 2018.

(51) Int. Cl.
*B62J 43/16* (2020.01)
*B62J 17/10* (2020.01)
(Continued)

(52) U.S. Cl.
CPC .............. *B62J 43/16* (2020.02); *B62J 11/16* (2020.02); *B62J 17/10* (2020.02); *B62J 50/30* (2020.02);
(Continued)

(58) Field of Classification Search
CPC .. B62K 11/04; B62K 2204/00; B60Y 2200/12
See application file for complete search history.

(56) References Cited

U.S. PATENT DOCUMENTS 9,027,694 B2   5/2015  Matsuda
9,160,214 B2   10/2015 Matsuda
(Continued)

FOREIGN PATENT DOCUMENTS

CN       1300693 A      6/2001
DE    102012211516 A1   5/2014
(Continued)

OTHER PUBLICATIONS

Examination Report for Indian Patent Application No. 202047042541 dated Mar. 3, 2021.
(Continued)

*Primary Examiner* — Tony H Winner
(74) *Attorney, Agent, or Firm* — Thomas | Horstemeyer, LLP

(57) ABSTRACT

A straddle-type electric vehicle, comprising a pair of left and right main frames, a seat rail extending rearward from a rear portion of each of the main frames, a pivot frame extending downward from a rear portion of each of the main frames, a swing arm supported by the pivot frame, a battery arranged in a space between the main frames, a power unit arranged in the space, a wind guiding duct for guiding traveling wind to the space, and an air outlet port for emitting the traveling wind, the air outlet port being provided so as to be capable of emitting the traveling wind inside the wind guiding duct from a lower portion of a vehicle body to an area below the vehicle body.

11 Claims, 9 Drawing Sheets

(51) Int. Cl.
  *B62K 11/04* (2006.01)
  *B62J 11/16* (2020.01)
  *B62J 50/30* (2020.01)

(52) U.S. Cl.
  CPC ........... *B62K 11/04* (2013.01); *B60Y 2200/12* (2013.01); *B62K 2204/00* (2013.01)

(56) References Cited

U.S. PATENT DOCUMENTS

| | | | |
|---|---|---|---|
| 9,242,599 B2 | 1/2016 | Shimizu et al. | |
| 9,868,486 B2 | 1/2018 | Hagimoto et al. | |
| 9,941,556 B2 | 4/2018 | Testoni | |
| 10,270,314 B2 | 4/2019 | Matsuda | |
| 11,407,465 B2 * | 8/2022 | Ikeda | B62J 17/10 |
| 2010/0163326 A1 * | 7/2010 | Takamura | H01M 10/613 |
| | | | 180/68.5 |
| 2013/0256049 A1 | 10/2013 | Matsuda | |
| 2013/0270938 A1 | 10/2013 | Matsuda | |
| 2013/0270940 A1 * | 10/2013 | Matsuda | B62K 11/06 |
| | | | 310/64 |
| 2014/0015656 A1 | 1/2014 | Shimizu et al. | |
| 2014/0252798 A1 * | 9/2014 | Angelo | B62D 33/0604 |
| | | | 296/180.2 |
| 2016/0236748 A1 | 8/2016 | Matsuda | |
| 2016/0240900 A1 | 8/2016 | Testoni | |
| 2016/0280059 A1 | 9/2016 | Hagimoto et al. | |

FOREIGN PATENT DOCUMENTS

| | | |
|---|---|---|
| EP | 1108585 B1 | 6/2006 |
| EP | 2523236 A1 | 11/2012 |
| JP | H07323878 A | 12/1995 |
| JP | 2012179987 A | 9/2012 |
| JP | 2016535388 A | 11/2016 |
| JP | 2017081486 A | 5/2017 |
| WO | 2012066601 A1 | 5/2012 |
| WO | 2012117807 A1 | 9/2012 |
| WO | 2015049711 A1 | 4/2015 |
| WO | 2015052647 A1 | 4/2015 |
| WO | 2019186946 A1 | 10/2019 |

OTHER PUBLICATIONS

Chinese Office Action for Chines Patent Application No. 201880091440.9 dated May 26, 2021 (partially translated).
International Search Report for PCT/JP2018/013421 dated Jun. 12, 2018.
German Office Action for German Patent Application No. 112018007187.1 dated Feb. 16, 2023 (partially translated).

* cited by examiner

F I G. 8B
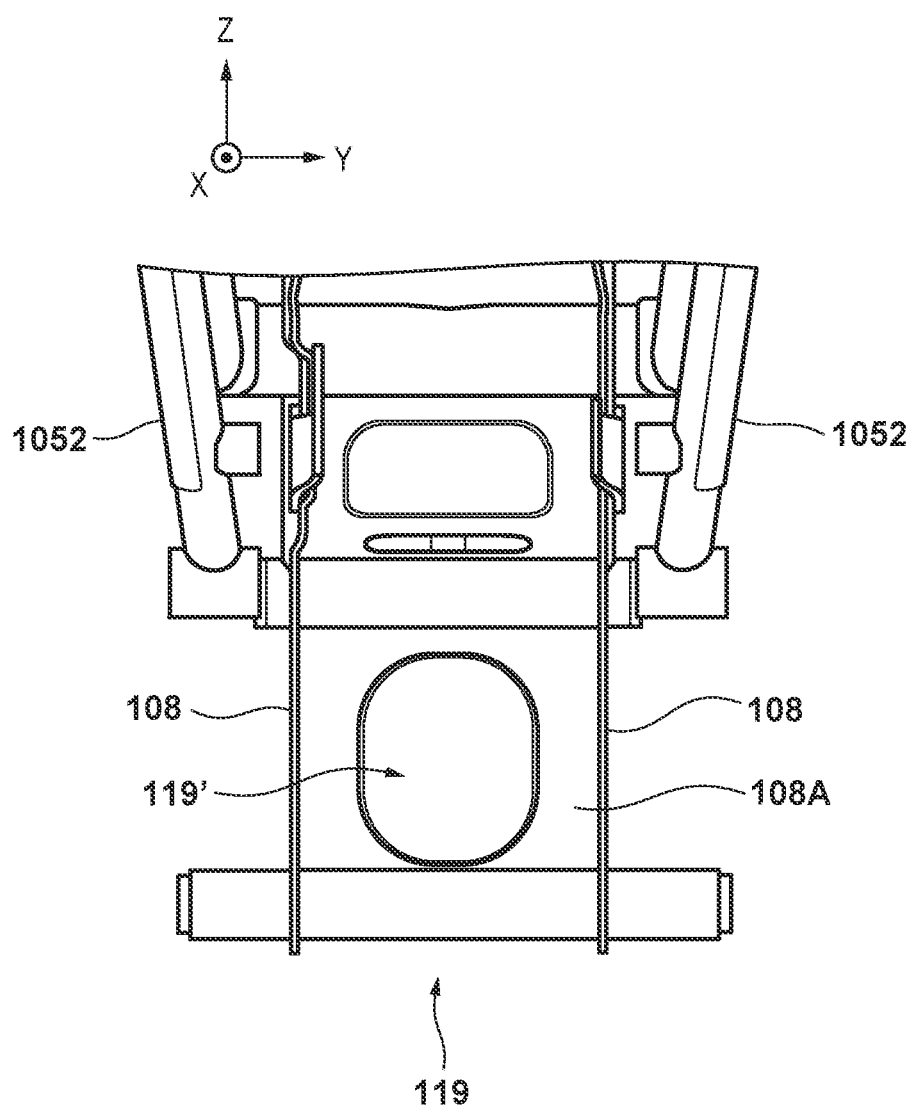

STRADDLE-TYPE ELECTRIC VEHICLE

CROSS-REFERENCE TO RELATED APPLICATION(S)

This application is a continuation of International Patent Application No. PCT/JP2018/013421 filed on Mar. 29, 2018, the entire disclosure of which is incorporated herein by reference.

TECHNICAL FIELD

The present invention relates to a straddle-type electric vehicle.

BACKGROUND ART

PTL 1 describes a configuration of a straddle-type electric vehicle (electric two-wheeled vehicle) in which an electric motor device is cooled using traveling wind. According to PTL 1, traveling wind that has flowed in from an inflow port on a front portion of a vehicle body passes through the inside of a case of the electric motor device and then flows out from an outflow port on a rear portion of the vehicle body, as a result, the electric motor device is cooled. Note that a predetermined power unit, such as an electric motor that generates motive power based on the electric power from a battery (e.g., a three-phase induction motor), is used for the electric motor device.

CITATION LIST

Patent Literature

PTL 1: International Publication No. 2012/066601

SUMMARY OF INVENTION

Technical Problem

In order to improve the cooling performance that utilizes traveling wind, there is demand that the air that absorbed heat when cooling a predetermined cooling target, such as the aforementioned power unit, be appropriately emitted to the outside of a vehicle without residing inside a vehicle body. The structure of PTL 1 has left room for structural improvement for appropriately emitting such air.

It is an object of the present invention to improve the cooling performance that utilizes traveling wind in a vehicle body structure of a straddle-type electric vehicle.

Solution to Problem

A first aspect of the present invention pertains to a straddle-type electric vehicle, the straddle-type electric vehicle including: a pair of left and right main frames that is installed so as to extend in a longitudinal direction of a vehicle body; a seat rail that is installed so as to extend rearward from a rear portion of each of the pair of left and right main frames; a pivot frame that is installed so as to extend downward from a rear portion of each of the pair of left and right main frames; a swing arm that is supported by the pivot frame and by which a rear wheel is swingably supported; a battery that is arranged in a space between the pair of left and right main frames in a plan view; a power unit that is arranged in the space in a plan view and generates motive power based on electric power of the battery; a wind guiding duct for guiding traveling wind to the space; and an air outlet port for emitting the traveling wind, wherein the air outlet port is provided so as to be capable of emitting the traveling wind inside the wind guiding duct to an area below the vehicle body.

Advantageous Effects of Invention

According to the present invention, the cooling performance that utilizes traveling wind can be improved in a vehicle body structure of a straddle-type electric vehicle.

BRIEF DESCRIPTION OF DRAWINGS

FIG. 8B is a diagram for describing the structure of the lower portion of the vehicle body that forms the air outlet port.

DESCRIPTION OF EMBODIMENTS

Figure 1:
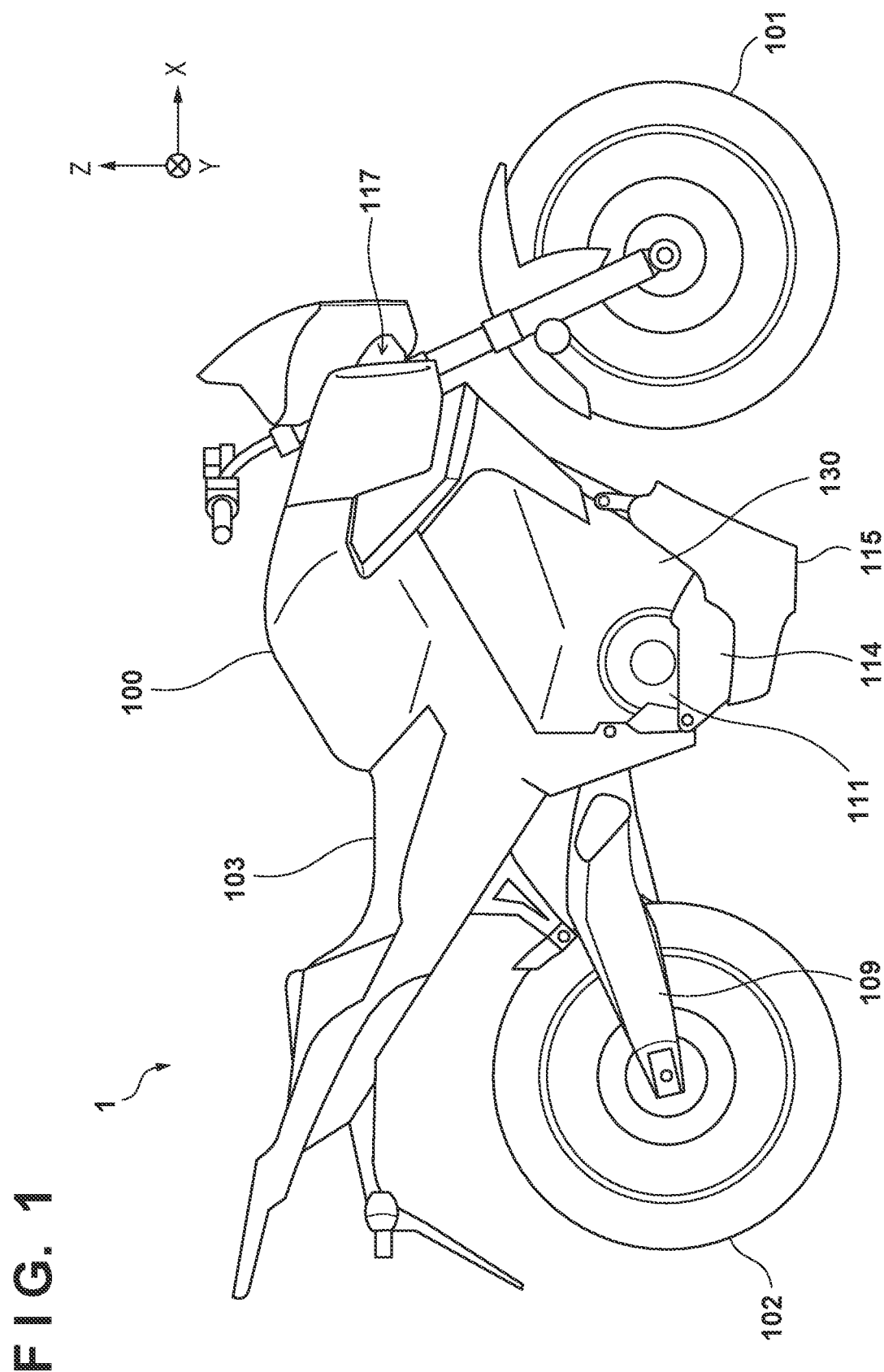
FIG. 1 is a left side view for describing a configuration of a straddle-type electric vehicle (two-wheeled vehicle).

Hereinafter, embodiments will be described in detail with reference to the attached drawings. Note that each drawing is a schematic diagram that shows a structure or a configuration of an embodiment, and the dimensions of each member shown do not necessarily reflect the actual dimensions. Furthermore, in the attached drawings, the same reference numerals are given to the same or similar elements, and redundant description thereof is omitted.

Figure 2:
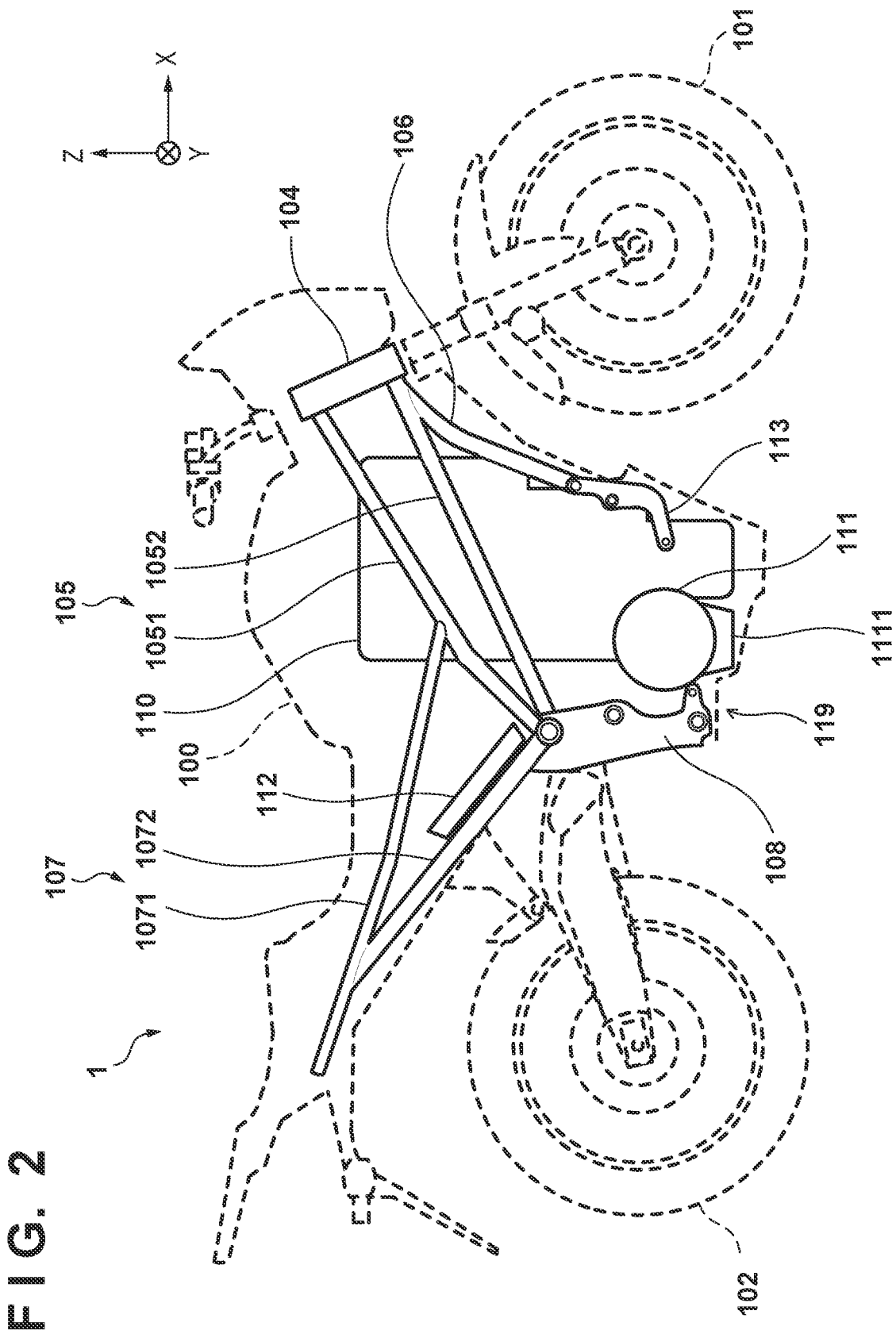
FIG. 2 is a left side view for describing an internal structure of a straddle-type electric vehicle.

FIG. 1 is a left side view of a straddle-type electric vehicle 1 according to an embodiment. Also, FIG. 2 shows an internal structure, together with an outer shape, of the straddle-type electric vehicle 1. In the figures, in order to facilitate the understanding of the structure, an X-axis, a Y-axis, and a Z-axis that are perpendicular to one another are shown (the same goes for other figures that will be described later). The X direction corresponds to the longitudinal direction of a vehicle body, the Y direction corresponds to the vehicle width direction or the left-and-right direction of the vehicle body, and the Z direction corresponds to the up-and-down direction of the vehicle body. In the present specification, such expressions as front/rear, left/right (side), and up/down indicate relative positional relationships based on the vehicle body. For example, such expressions as "front" and "anterior to" correspond to the +X direction, and such expressions as "rear" and "posterior to" correspond to the −X direction. Similarly, such expressions as inward in the vehicle width direction (the inner side of the vehicle)/outward in the vehicle width direction (the outer side of the vehicle) also indicate relative positional relationships based on the vehicle body.

In the present embodiment, the straddle-type electric vehicle 1 is a motorcycle that a rider (driver) can ride by straddling a vehicle body 100, and includes a front wheel 101 and a rear wheel 102. A seat 103 on which the rider can be seated is provided on the vehicle body 100. In addition, the straddle-type electric vehicle 1 further includes a head pipe 104, main frames 105, down frames 106, seat rails 107, pivot frames 108, and swing arms 109 within the vehicle body 100. The main frames 105, down frames 106, seat rails 107, pivot frames 108, and swing arms 109 are provided as a pair on the left and right; this, however, is not shown because FIG. 1 and FIG. 2 are left side views. Note that the foregoing frames 105 to 108 may be collectively referred to as, for example, a vehicle body frame.

The head pipe 104 is arranged at the front of the vehicle body 100 in such a manner that a handle bar is turnably supported thereby, and the rider can perform a steering operation while changing the orientation of the front wheel 101 via a front fork by turning this handle bar.

The pair of left and right main frames 105 is installed so as to extend from the head pipe 104 in the longitudinal direction of the vehicle body while becoming distanced from each other in the left-and-right direction. In the present embodiment, the main frame 105 includes an upper frame portion 1051 and a lower frame portion 1052. A non-illustrated reinforcement member, such as a truss frame, may be mounted between the upper frame portion 1051 and the lower frame portion 1052; this can improve the strength of the main frame 105. In the present embodiment, the down frame 106 is installed so as to extend downward and rearward from a front portion of the lower frame portion 1052.

The seat rail 107 is installed so as to extend rearward from a rear portion of the main frame 105, and supports a load applied to the seat 103. In the present embodiment, the seat rail 107 includes an upper frame portion 1071 and a lower frame portion 1072. A non-illustrated reinforcement member, such as a truss frame, may be mounted between the upper frame portion 1071 and the lower frame portion 1072; this can improve the strength of the seat rail 107.

The pivot frame 108 is installed so as to extend downward from a rear portion of the main frame 105, the swing arm 109 is supported by this pivot frame 108, and the rear wheel 102 is swingably supported by the swing arm 109.

The straddle-type electric vehicle 1 further includes a battery 110, a power unit 111, and a control apparatus 112. As the battery 110, a chargeable secondary battery is used, examples of which include a lithium-ion battery, a nickel-hydrogen battery, and the like. The power unit 111 generates motive power (rotation) based on the electric power of the battery 110. An electric motor, such as a three-phase induction motor, is used as the power unit 111. Note that the power unit 111 may be referred to as, for example, a motor unit.

The control apparatus 112 is also referred to as, for example, a PDU (power drive unit) with the inclusion of a function of converting direct-current voltage into alternating-current voltage, or is also referred to as, for example, a PCU (power control unit) with the further inclusion of a function of converting alternating-current voltage into direct-current voltage, a function of converting a voltage level, and the like. For example, the control apparatus 112 controls the power unit 111 by converting the electric power of the battery 110 into a predetermined type and supplying the converted electric power to the power unit 111. Furthermore, the control apparatus 112 can also charge the battery 110 using the electric power that has been generated by regenerative braking of the power unit 111.

The battery 110 is arranged in the space between the pair of left and right main frames 105 in a plan view (from a viewpoint in the −Z direction), and is also arranged so as to overlap the main frames 105 in a side view (from a viewpoint in the +Y direction). The battery 110 is supported either directly or indirectly with respect to the main frames 105; in the present embodiment, the battery 110 is fixed between the pair of left and right main frames 105 by a hanger 113 below the down frames 106.

The power unit 111 is arranged in the space between the pair of left and right main frames 105 in a plan view, and is, in the present embodiment, fixed via a predetermined mount unit 114 with respect to the pivot frames 108 in a lower portion of the vehicle body 100. In this way, the power unit 111 is fixed at a position where it can appropriately transmit motive power to the rear wheel 102, and this motive power is transmitted to the rear wheel 102 via, for example, a chain.

The control apparatus 112 is fixed with respect to the seat rails 107 and is, in the present embodiment, arranged between the lower frame portions 1072 and the upper frame portions 1071; in this way, the control apparatus 112 can be protected from external shock. Furthermore, as the control apparatus 112 is positioned posterior to the battery 110 and above the power unit 111, a wire unit (wire harness) that is used to supply the electric power of the battery 110 to the power unit 111 can be made relatively short.

Figure 3:
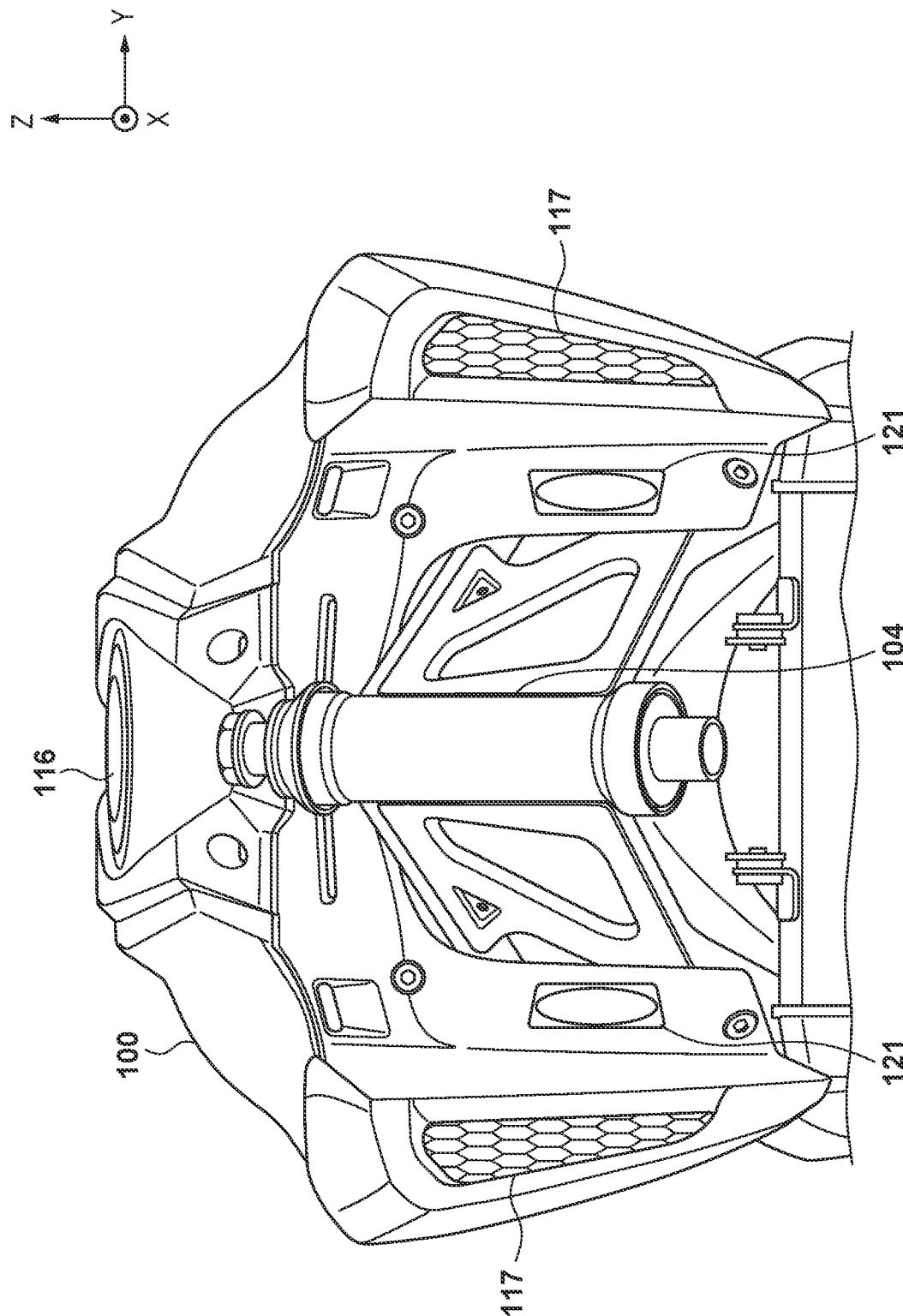
FIG. 3 is a front view for describing a vehicle body of a straddle-type electric vehicle.
Figure 4:
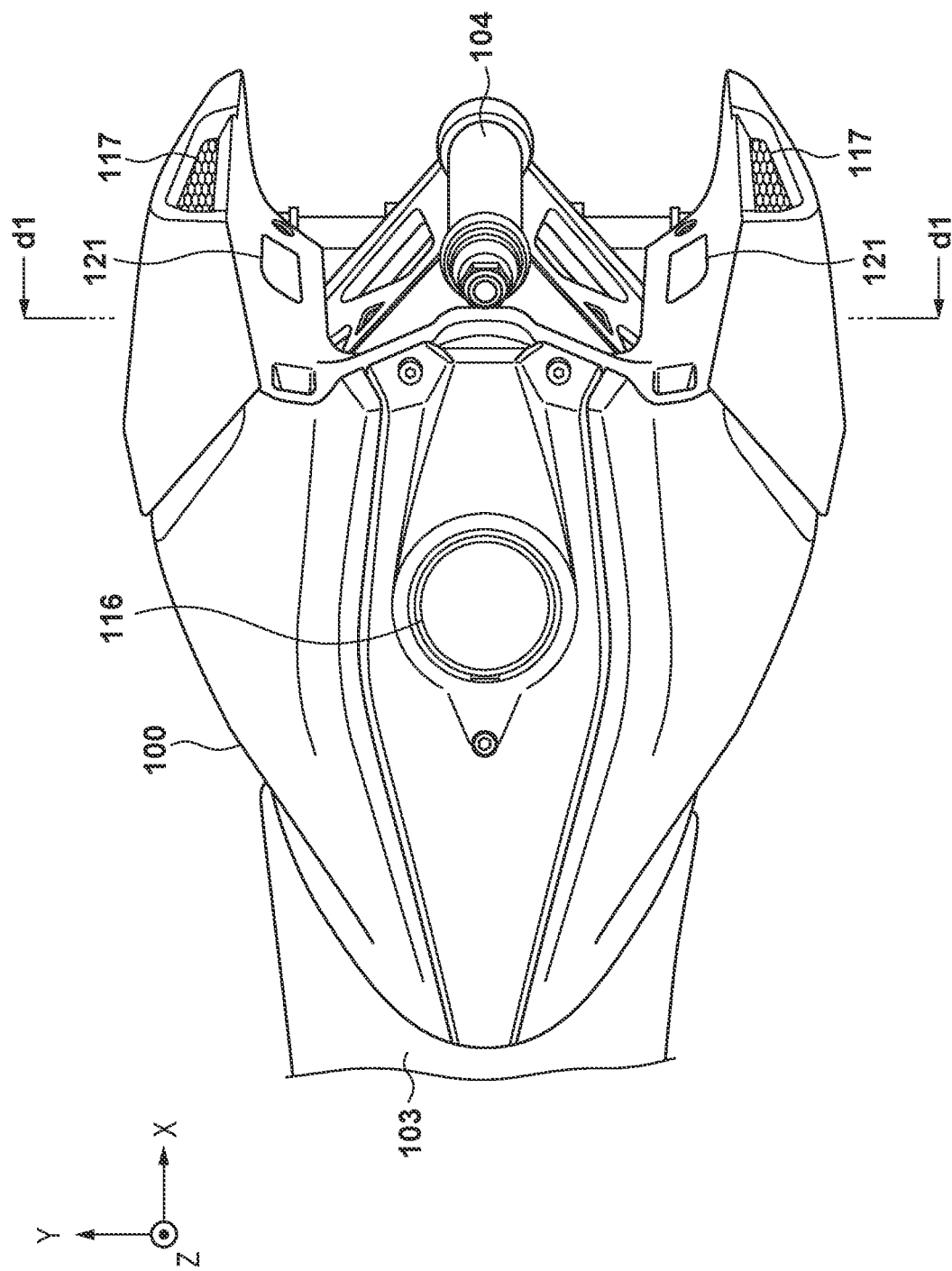
FIG. 4 is a top view for describing a vehicle body of a straddle-type electric vehicle.

FIG. 3 is a front view related to apart of the vehicle body 100. Also, FIG. 4 is atop view related to apart of the vehicle body 100. An upper surface of the vehicle body 100 is provided with a charging terminal unit 116, and the battery 110 can be charged by connecting a charging plug to this terminal unit 116. Also, the straddle-type electric vehicle 1 further includes a pair of left and right air intake ports 117, and the vehicle body 100 is formed so as to protrude frontward, with this pair of left and right air intake ports 117 formed on both sides of the head pipe 104. These air intake ports 117 allow a later-described wind guiding duct 118 to take in traveling wind. The air intake ports 117 may be provided with, for example, mesh sheets so as to prevent entrance of foreign substances (e.g., rain water, flying stones, and the like).

Figure 5:
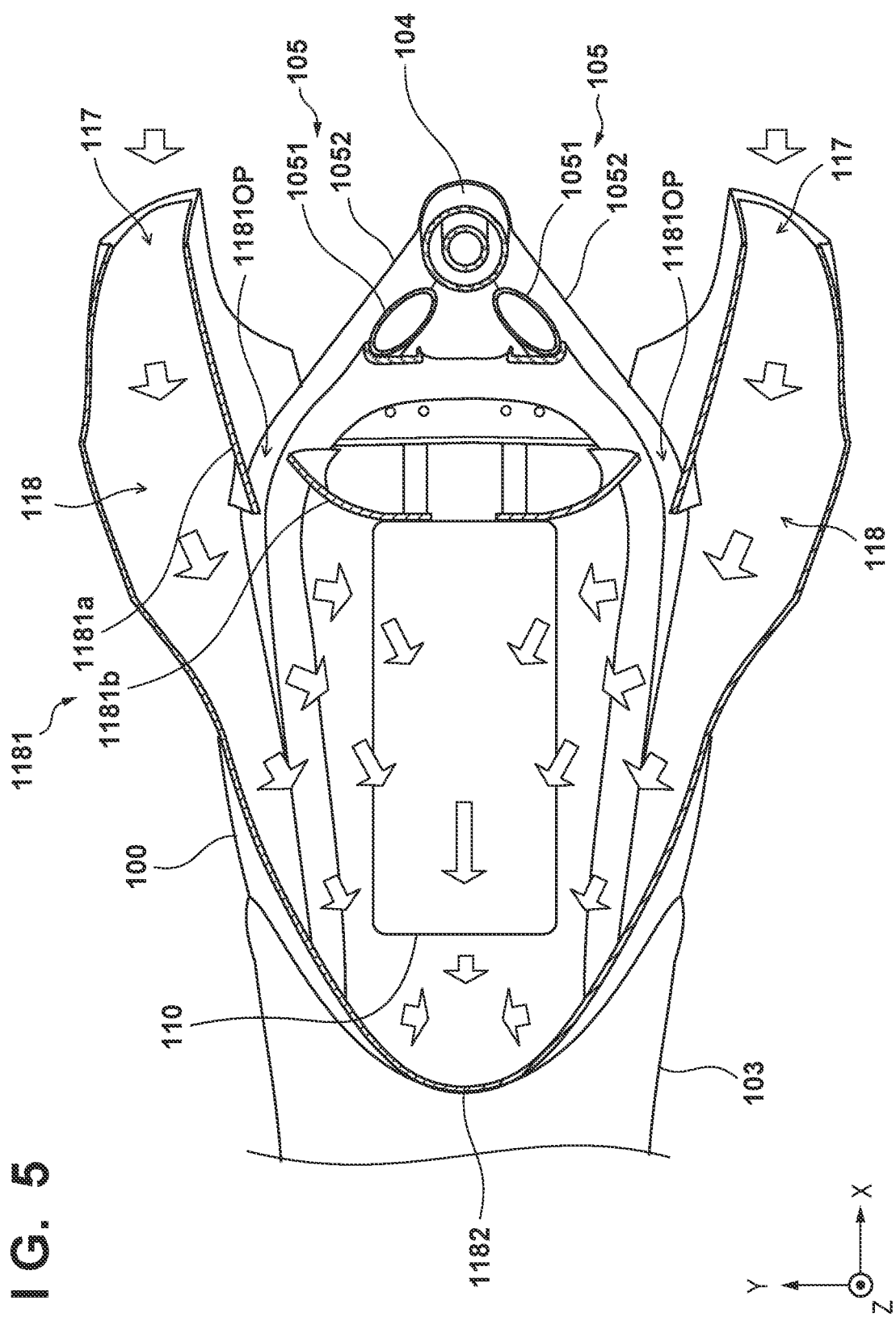
FIG. 5 is a cross-sectional view for describing a vehicle body of a straddle-type electric vehicle.

FIG. 5 is a cross-sectional view taken along the line d1-d1 of FIG. 4. The straddle-type electric vehicle 1 further includes a wind guiding duct 118 within the vehicle body 100. The wind guiding duct 118 guides traveling wind that has been taken in from the air intake ports 117 in a predetermined direction. In the present embodiment, the air intake ports 117 are positioned more outward in the vehicle width direction than the main frames 105 in a plan view. This can increase the amount of traveling wind that is taken in. Furthermore, the wind guiding duct 118 is mounted in such a manner that, in a plan view, it extends from an upper portion of the battery 110 more outward in the vehicle width direction than the pair of left and right main frames 105. In this way, the size of the battery 110 in the vehicle width direction can be increased, and the capacity of the battery 110 can be increased. However, the positions of the air intake ports 117 and the wind guiding duct 118 relative to the main frames 105 may be changed in accordance with a change in the arrangement of the constituents of the vehicle inside the vehicle body 100. Note that in order to facilitate the understanding, traveling wind is indicated by arrows in the figure.

Here, out of the interior wall that forms the wind guiding duct 118, an inner portion in the vehicle width direction (hereinafter, an inner interior wall) 1181 is provided so as to extend from the air intake ports 117 to a front surface of the battery 110. The inner interior wall 1181 has an insertion hole 1181OP that allows the main frame 105 to be inserted therethrough. In the figure, out of the inner interior wall 1181, a portion that is anterior to the insertion hole 1181OP is depicted as an inner interior wall front portion 1181a, and a portion that is posterior to the insertion hole 1181OP is depicted as an inner interior wall rear portion 1181b. The inner interior wall front portion 1181a is curved in such a manner that it deflects toward the outer side of the vehicle body so as to be distanced from the mainframe 105. The inner interior wall rear portion 1181b is curved in such a manner that it deflects toward the inner side of the vehicle body so as to be distanced from the main frame 105. Note that the inner interior wall 1181 may be formed by fitting together two or more members.

Figure 6:
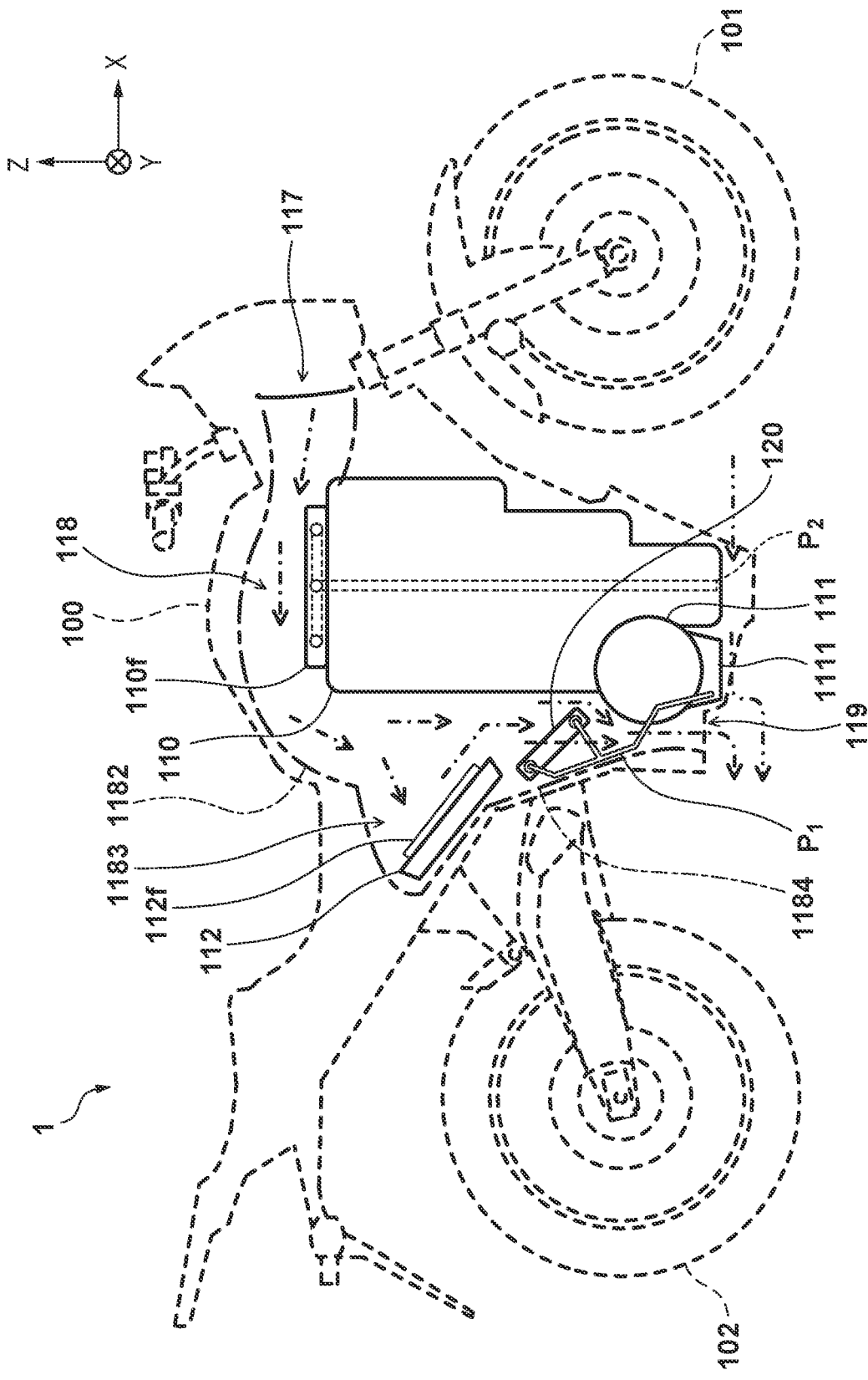
FIG. 6 is a left side view for describing an internal structure of a straddle-type electric vehicle.

FIG. 6 is a left side view of the straddle-type electric vehicle 1 for describing the wind guiding duct 118. The wind guiding duct 118 includes a guide portion 1182 that is installed so as to extend toward an area below the vehicle body while curving, so that traveling wind that has been taken in from the air intake ports 117 and flowed toward the rear of the vehicle body is guided to the area below the vehicle body. Due to this configuration, traveling wind passes the main frames 105, passes the upper portion or the sides of the battery 110, and then is guided by the guide portion 1182 behind the battery 110 to the area below the vehicle body.

The wind guiding duct 118 further includes a recess portion 1183 that is recessed from the guide portion 1182 toward the rear of the vehicle body. The recess portion 1183 is positioned so as to overlap the seat rails 107 (see FIG. 2) in a side view, and the aforementioned control apparatus 112 is disposed in this recess portion 1183. In other words, the recess portion 1183 is formed by recessing the interior wall of the wind guiding duct 118 toward the rear of the vehicle body so that at least a part of traveling wind is guided to the control apparatus 112.

In the present embodiment, a heat dissipation fin 112f is provided on an upper surface of the control apparatus 112, and the control apparatus 112 can be cooled by traveling wind that has been guided to the recess portion 1183. Although not shown here, another heat dissipation fin may be provided also on a lower surface of the control apparatus 112, and this fin may protrude to the outside of the vehicle body 100 so as to be in proximity to a rear fender, for example.

The straddle-type electric vehicle 1 further includes an air outlet port 119 for emitting traveling wind. In the present embodiment, the air outlet port 119 is provided in the lower portion of the vehicle body, and is provided between the power unit 111 and the pivot frames 108 so as to be capable of emitting traveling wind to the area below the vehicle body. That is to say, as indicated by the arrows with the dash and single-dot lines in FIG. 6, traveling wind that has been taken in from the air intake ports 117 passes the main frames 105 and passes the upper portion or the sides of the battery 110 as guided by the wind guiding duct 118, then is guided by the aforementioned guide portion 1182 toward the area below the vehicle body, and thereafter is emitted from this air outlet port 119. During travel of the straddle-type electric vehicle 1, another traveling wind passes in the lower portion of the vehicle body as indicated by the arrows with the dash and double-dot lines in FIG. 6, and negative pressure is generated between a travel surface, such as a road, and the vehicle body 100. Therefore, the aforementioned traveling wind is appropriately emitted to the area below the vehicle body without residing inside the wind guiding duct 118.

Here, in the wind guiding duct 118, an interior wall (interior wall rear portion) 1184 is provided below the aforementioned recess portion 1183 so as to extend toward the air outlet port 119 in order to guide traveling wind to the area below the vehicle body. Therefore, the air inside the recess portion 1183 is also appropriately emitted to the area below the vehicle body due to the aforementioned negative pressure without residing inside the recess portion 1183. Note that as shown in FIG. 1, a side portion of the vehicle body is covered by a side cover 130, and the aforementioned traveling wind is guided to the area below the vehicle body without leaking from the wind guiding duct 118.

Figure 7:
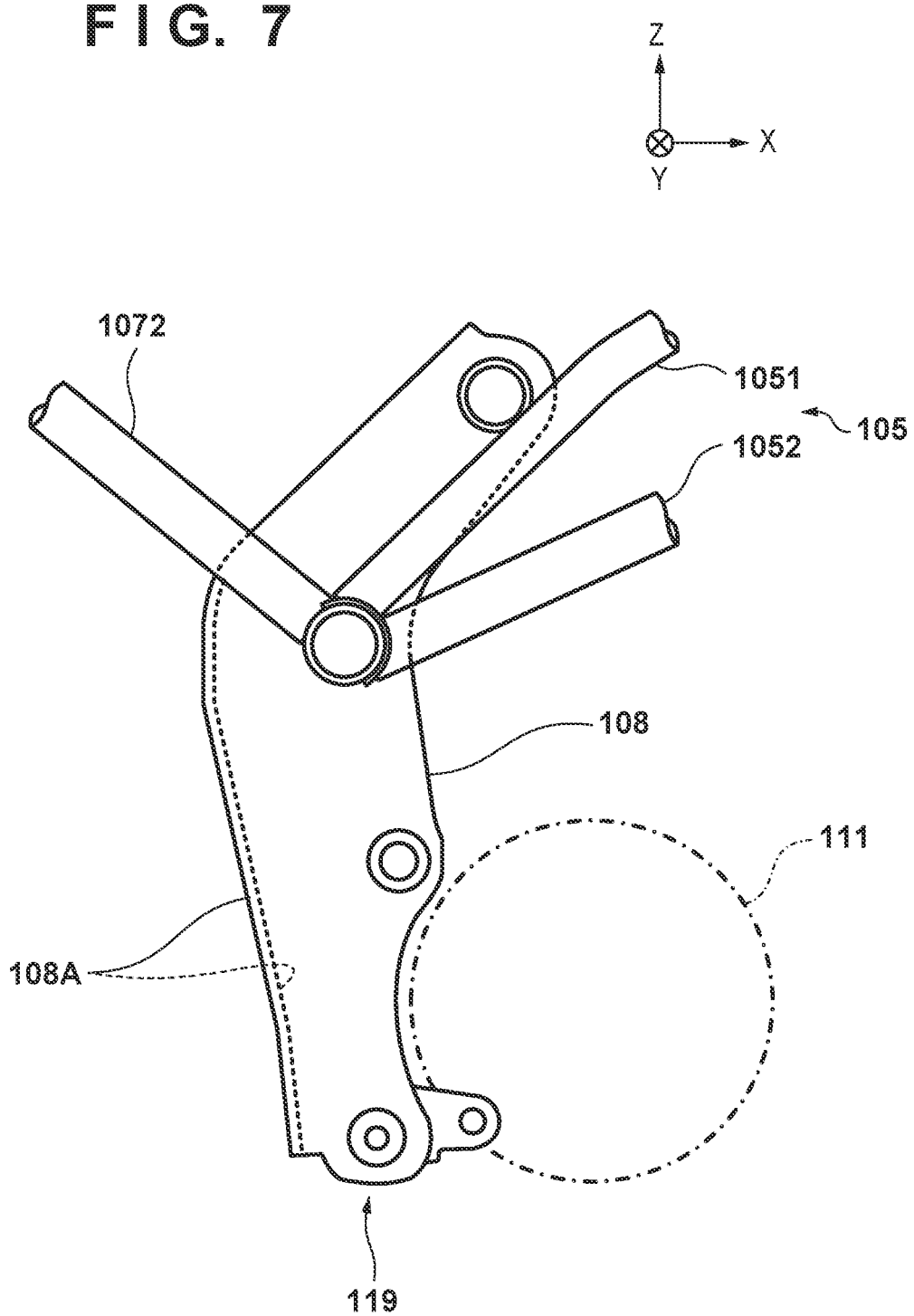
FIG. 7 is a diagram for describing a structure of a lower portion of a vehicle body that forms an air outlet port.

FIG. 7 is a left side view showing a structure of the lower portion of the vehicle body of the straddle-type electric vehicle 1, mainly a structure that forms the air outlet port 119. A back plate 108A is provided across the pair of left and right pivot frames 108 along rear edge portions of the pivot frames 108; thus, the pair of left and right pivot frames 108 and the back plate 108A form a U-shape in a plan view. The air outlet port 119 is formed so as to be surrounded by the power unit 111 that is positioned anterior thereto, by the pivot frames 108 that are positioned on the sides thereof, and by the back plate 108A that is positioned posterior thereto. Note that the back plate 108A forms a lower end portion of the aforementioned interior wall 1184. Due to this configuration, in the present embodiment, the air outlet port 119 is provided on a lower surface of the vehicle body of the straddle-type electric vehicle 1 so as to be at the substantially same height as the power unit 111, and can emit traveling wind from the lower portion of the vehicle body to the area below the vehicle body.

Furthermore, according to the present embodiment, a housing of the power unit 111 itself forms a part of the air outlet port 119. Therefore, the aforementioned emitted traveling wind directly hits the power unit 111; this makes it possible to cool the housing of the power unit 111, and accordingly cool the inside of the power unit 111.

Referring to FIG. 6 again, the straddle-type electric vehicle 1 further includes a heat exchanger 120. The heat exchanger 120 is fixed or installed with respect to, for example, the main frames 105. In the present embodiment, the power unit 111 is configured to be coolable by a cooling medium circulating therein, and the heat exchanger 120 is connected to the power unit 111 via a pipe $P_1$ that forms a flow path for the cooling medium. In the present embodiment, a cooling medium reservoir unit 111 for reserving the cooling medium is mounted on a lower portion of the power unit 111, and the heat exchanger 120 is connected to the cooling medium reservoir unit 111 via the pipe $P_1$.

Such liquids as water and oil are used as the aforementioned cooling medium. When water is used as the cooling medium (in the case of so-called water cooling), for example, a heat sink and a heat pipe may be used as the heat exchanger 120 and the pipe $P_1$, respectively. In another example, a radiator may be used as the heat exchanger 120, and consequently a water pump, a reservoir tank, and the like may be further used. In this case, the pipe $P_1$ is also referred to as, for example, a water jacket. On the other hand, when oil is used as the cooling medium (in the case of so-called oil cooling), an oil cooler may be used as the heat exchanger 120, and consequently an oil pump and the like may be further used. In this case, the pipe $P_1$ is also referred to as, for example, an oil path, and the cooling medium reservoir unit 1111 is also referred to as, for example, an oil pan.

In the present embodiment, the heat exchanger 120 is positioned anterior to the interior wall 1184 and above the power unit 111 inside the wind guiding duct 118, and during travel of the straddle-type electric vehicle 1, the heat exchanger 120 is hit by traveling wind that has been guided by the guide portion 1182 and the interior wall 1184. The cooling medium that absorbed heat in the power unit 111 reaches the heat exchanger 120 via the pipe $P_1$, then is cooled by the aforementioned traveling wind in this heat exchanger 120 (heat exchanging), and thereafter returns to the cooling medium reservoir unit 1111. As a result, the power unit 111 is cooled appropriately.

It is sufficient that the heat exchanger 120 be disposed at least on the path of traveling wind to the air outlet port 119 inside the wind guiding duct 118, especially in a position where the amount of wind is relatively large inside the wind guiding duct 118. Preferably, it is sufficient that the heat exchanger 120 be positioned so as to overlap the air outlet port 119 when viewed in the direction parallel to the direction in which the interior wall 1184 (or the back plate 108A) extends. In this way, traveling wind hits the heat exchanger 120, and the cooling medium can be cooled appropriately.

It is sufficient that the orientation in which the heat exchanger 120 is fixed be determined based on a type of heat exchange for the cooling medium. For example, when the heat exchanger 120 is a radiator or an oil cooler, it is sufficient that the heat exchanger 120 be fixed in orientation so as to intersect the direction in which the interior wall 1184 extends, so that the surface direction thereof intersects the direction of traveling wind. Also, for example, when the heat exchanger 120 is a heat sink, it is sufficient that the heat exchanger 120 be fixed in orientation so as to be parallel to the direction in which the interior wall 1184 extends, so that the orientation thereof allows easy passage of traveling wind. These modes can improve the efficiency of heat exchange in the heat exchanger 120, and appropriately cool the cooling medium.

Referring to FIG. 5 again, in the present embodiment, the battery 110 is supported so that an upper surface thereof is hit by traveling wind. Also, as shown in FIG. 6, the battery 110 is provided with a heat pipe $P_2$, and a heat sink 110$f$ is mounted on the upper surface of the battery 110. The heat pipe $P_2$ is installed so as to extend in the up-and-down direction of the vehicle body, is connected to the battery 110, and in the present embodiment, is provided inside the battery 110. The heat sink 110$f$ is formed by a plurality of fins, and each fin is installed so as to extend in the longitudinal direction of the vehicle body and is connected to the heat pipe $P_2$. Due to this configuration, the battery 110 can be cooled when traveling wind passes the upper portion of the battery 110.

In the present embodiment, as traveling wind also passes the side surfaces of the battery 110, a heat dissipation fin may be accordingly provided on these side surfaces. Traveling winds that have passed the upper portion and the sides of the battery 110 merge behind the battery 110 and are guided by the guide portion 1182 to the area below the vehicle body.

Referring to FIG. 3 again, the straddle-type electric vehicle 1 further includes a pair of left and right blower fans 121. The blower fans 121 are arranged at the front of the vehicle body 100 in alignment with the air intake ports 117. During travel of the straddle-type electric vehicle 1, the air intake ports 117 allow the wind guiding duct 118 to take in traveling wind. On the other hand, in a non-traveling state (e.g., while the vehicle is stopped due to traffic congestion and the like), as traveling wind is not generated, wind is created by driving the blower fans 121, thereby generating currents of air inside the wind guiding duct 118. In this way, even in a non-traveling state, the battery 110, the power unit 111, and the control apparatus 112 can be cooled appropriately.

The aforementioned pair of left and right blower fans 121 is positioned more outward in the vehicle width direction than the head pipe 104. Here, the blower fans 121 are positioned more inward in the vehicle width direction than the air intake ports 117. While the amount of wind inside the wind guiding duct 118 during travel is in conformity with the amount of traveling wind taken in by the air intake ports 117, the amount of wind created in a non-traveling state is in conformity with a drive force of the blower fans 121. Therefore, it is sufficient that the air intake ports 117 be positioned more outward in the vehicle width direction than the blower fans 121. Note that it is sufficient that the blower fans 121 be driven both during travel and in a non-traveling state; this makes it possible to also reduce air resistance during travel.

The present embodiment adopts a configuration in which the wind guiding duct 118 guides traveling wind to the space between the pair of left and right main frames 105 in which the battery 110 and the power unit 111 are arranged in a plan view, and this traveling wind is emitted from the air outlet port 119 that is provided in the lower portion of the vehicle body. In the present embodiment, the air outlet port 119 is provided between the power unit 111 and the pivot frames 108 so as to be capable of emitting traveling wind to the area below the vehicle body. As stated earlier, during travel of the straddle-type electric vehicle 1, negative pressure is generated between a travel surface, such as a road, and the vehicle body 100. Therefore, the air that absorbed heat inside the wind guiding duct 118 is appropriately emitted to the area below the vehicle body without residing inside the wind guiding duct 118; in this way, the cooling performance that utilizes traveling wind can be enhanced.

It is sufficient that the air outlet port 119 be provided so as to allow traveling wind inside the wind guiding duct 118 to be emitted from the lower portion of the vehicle body to the area below the vehicle body, and it is not limited to the example of the foregoing embodiment. For example, as another embodiment, another air outlet port may be provided in place of the air outlet port 119/in addition to the air outlet port 119.

Figure 8A:
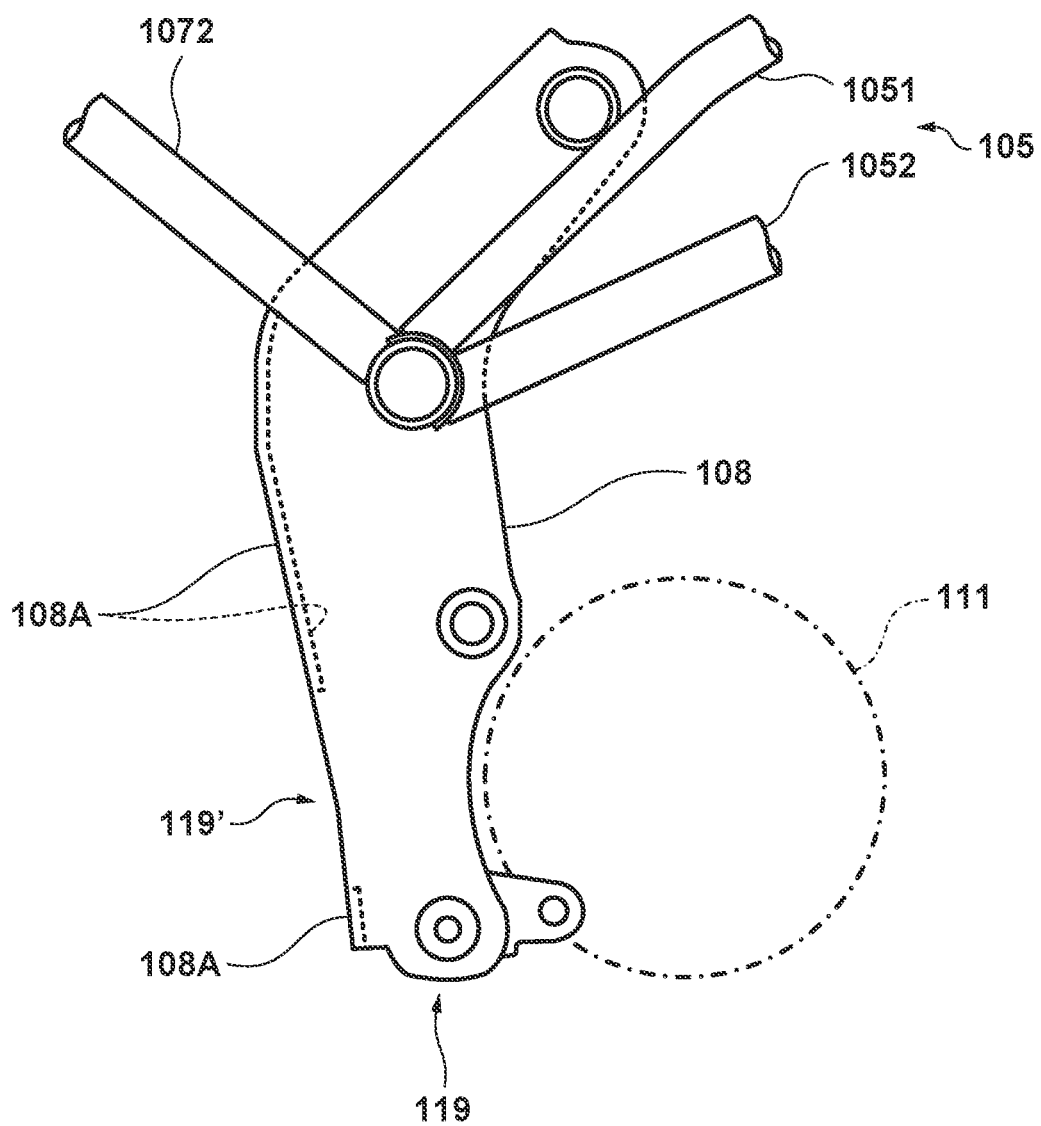
FIG. 8A is a diagram for describing the structure of the lower portion of the vehicle body that forms the air outlet port.

FIG. 8A is a left side view of a structure of the lower portion of the vehicle body in which another air outlet port 119' is further provided in addition to the air outlet port 119 as another embodiment. Also, FIG. 8B is a front view of this structure of the lower portion of the vehicle body. The air outlet port 119' is formed by creating an opening in the back plate 108A that is provided across the pair of left and right pivot frames 108 (see FIG. 7).

During travel of the straddle-type electric vehicle 1, negative pressure is generated between a travel surface and the vehicle body 100, and at the same time, negative pressure is generated also at the rear of the vehicle body 100. Therefore, due to the above-described structure, a part of traveling wind that has passed inside the wind guiding duct 118 hits the power unit 111 and then is emitted from the air outlet port 119' to an area below and posterior to the vehicle body. Therefore, the above-described structure also makes it possible to allow the air that absorbed heat inside the wind guiding duct 118 to be appropriately emitted to the area below the vehicle body without residing inside the wind guiding duct 118, and enhance the cooling performance that utilizes traveling wind.

Although the above has described examples of several preferred modes, the present invention is not limited to these examples and may be partially changed without departing from the intent of the present invention. Furthermore, individual terms that have been described in the present specification are merely used for the purpose of explaining the present invention, and it goes without saying that the present invention is not limited to strict meanings of such terms and can also include their equivalents.

For example, a straddle-type vehicle refers to a type that a driver rides by straddling a vehicle body, and its concept also includes, in addition to a motorcycle (including a scooter-type vehicle), a three-wheeled vehicle (a vehicle having one front wheel and two rear wheels, or two front wheels and one rear wheel) and the like.

The features of the above-described embodiment are summarized as follows.

A first mode pertains to a straddle-type electric vehicle (e.g., 1), the straddle-type electric vehicle including: a pair of left and right main frames (e.g., 105) that is installed so as to extend in a longitudinal direction of a vehicle body; a seat rail (e.g., 107) that is installed so as to extend rearward from a rear portion of each of the pair of left and right main frames; a pivot frame (e.g., 108) that is installed so as to extend downward from a rear portion of each of the pair of left and right main frames; a swing arm (e.g., 109) that is supported by the pivot frame and by which a rear wheel (e.g., 102) is swingably supported; a battery (e.g., 110) that is arranged in a space between the pair of left and right main frames in a plan view; a power unit (e.g., 111) that is arranged in the space in a plan view and generates motive power based on electric power of the battery; a wind guiding duct (e.g., 118) for guiding traveling wind to the space; and an air outlet port (e.g., 119) for emitting the traveling wind, wherein the air outlet port is provided so as to be capable of emitting the traveling wind inside the wind guiding duct from a lower portion of the vehicle body to an area below the vehicle body.

According to the first mode, the air that absorbed heat is appropriately emitted due to the negative pressure in the area below the vehicle body without residing inside the wind guiding duct; in this way, the cooling performance that utilizes traveling wind can be enhanced.

In a second mode, the power unit is supported in front of the pivot frame, and the air outlet port is provided between the power unit and the pivot frame.

According to the second mode, the air outlet port that is capable of emitting air to the area below the vehicle body can be formed with a relatively simple configuration.

In a third mode, the power unit is fixed with respect to the pivot frame in the space in a plan view.

According to the third mode, the power unit can be fixed at a position where it can appropriately transmit motive power to the wheel.

In a fourth mode, the wind guiding duct includes a guide portion (e.g., 1182) that is installed so as to extend in an up-and-down direction of the vehicle body so that the traveling wind is guided to the area below the vehicle body.

According to the fourth mode, traveling wind that has been taken in at an upper portion of the vehicle body can be appropriately guided to the power unit that is disposed in a lower portion of the vehicle body.

In a fifth mode, a control apparatus (e.g., 112) that controls the power unit by supplying electric power of the battery to the power unit is further included, wherein the control apparatus is fixed with respect to the seat rail.

According to the fifth mode, the control apparatus (PCU, PDU) can be disposed in a position where it can be appropriately protected from external shock and the like.

In a sixth mode, the wind guiding duct includes a recess portion (e.g., 1183) that is recessed toward a rear of the vehicle body so that at least a part of the traveling wind is guided to the control apparatus.

According to the sixth mode, the control apparatus can be cooled appropriately.

In a seventh mode, the power unit is configured to be coolable by a cooling medium circulating therein, the straddle-type electric vehicle further includes a heat exchanger (e.g., 120) that is connected to the power unit via a pipe (e.g., $P_1$) that forms a flow path for the cooling medium, and the heat exchanger is positioned on a path of the traveling wind to the air outlet port inside the wind guiding duct.

According to the seventh mode, traveling wind that has been guided by the wind guiding duct can hit the heat exchanger, and thus the power unit can be cooled appropriately.

In an eighth mode, the wind guiding duct includes an interior wall (e.g., 1184) that is connected to the air outlet port and extends so as to guide the traveling wind to the area below the vehicle body, and the heat exchanger is positioned so as to overlap the air outlet port when viewed in a direction parallel to a direction in which the interior wall extends.

According to the eighth mode, traveling wind can hit the heat exchanger appropriately.

In a ninth mode, the heat exchanger is a radiator, and the wind guiding duct includes an interior wall (e.g., 1184) that is connected to the air outlet port and extends so as to guide the traveling wind to the area below the vehicle body, and the heat exchanger is fixed in orientation so as to intersect a direction in which the interior wall extends.

According to the ninth mode, the heat dissipation effect in the heat exchanger can be improved.

In a tenth mode, the heat exchanger is an oil cooler, and the wind guiding duct includes an interior wall (e.g., 1184) that is connected to the air outlet port and extends so as to guide the traveling wind to the area below the vehicle body, and the heat exchanger is fixed in orientation so as to intersect a direction in which the interior wall extends.

According to the tenth mode, the heat dissipation effect in the heat exchanger can be improved.

In an eleventh mode, the heat exchanger is a heat sink, and the wind guiding duct includes an interior wall (e.g., 1184) that is connected to the air outlet port and extends so as to guide the traveling wind to the area below the vehicle body, and the heat exchanger is fixed in orientation so as to be parallel to a direction in which the interior wall extends.

According to the eleventh mode, the heat dissipation effect in the heat exchanger can be improved.

In a twelfth mode, a second heat pipe (e.g., $P_2$) and a second heat sink (e.g., 110f) are further included, the second heat pipe being installed so as to extend in an up-and-down direction of the vehicle body and connected to the battery, the second heat sink being provided on an upper surface of the battery and connected to the second heat pipe, wherein the wind guiding duct is provided so as to guide the traveling wind to the second heat sink.

According to the twelfth mode, the battery can be cooled appropriately.

The present invention is not limited to the above embodiments and various changes and modifications can be made within the spirit and scope of the present invention. Therefore, to apprise the public of the scope of the present invention, the following claims are made.

The invention claimed is:

1. A vehicle that is ridden by straddling, comprising:
a pair of left and right main frames that is installed so as to extend in a longitudinal direction of a vehicle body;
a seat rail that is installed so as to extend rearward from a rear portion of each of the pair of left and right main frames;
a pivot frame that is installed so as to extend downward from a rear portion of each of the pair of left and right main frames;
a swing arm that is supported by the pivot frame and by which a rear wheel is swingably supported;
a battery that is arranged in a space between the pair of left and right main frames in a plan view;
a power unit that is arranged in the space in the plan view and generates motive power based on electric power of the battery;
a wind guiding duct for guiding traveling wind to the space; and
an air outlet port for emitting the traveling wind,
wherein the air outlet port is capable of emitting the traveling wind inside the wind guiding duct from a lower portion of the vehicle body to an area below the vehicle body,
the power unit is supported in front of the pivot frame, and
the air outlet port is provided between the power unit and the pivot frame.

2. The vehicle according to claim 1, wherein the power unit is fixed with respect to the pivot frame in the space in the plan view.

3. The vehicle according to claim 2, wherein the wind guiding duct includes a guide portion that is installed so as to extend in an up-and-down direction of the vehicle body so that the traveling wind is guided to the area below the vehicle body.

4. The vehicle according to claim 1, further comprising
a control apparatus that controls the power unit by supplying electric power of the battery to the power unit,
wherein the control apparatus is fixed with respect to the seat rail.

5. The vehicle according to claim 4, wherein
the wind guiding duct includes a recess portion that is recessed toward a rear of the vehicle body so that at least a part of the traveling wind is guided to the control apparatus.

6. The vehicle according to claim 1, wherein
the power unit is configured to be coolable by a cooling medium circulating therein,
the straddle-type electric vehicle further includes a heat exchanger that is connected to the power unit via a pipe that forms a flow path for the cooling medium, and
the heat exchanger is positioned on a path of the traveling wind to the air outlet port inside the wind guiding duct.

7. The vehicle according to claim 6, wherein
the wind guiding duct includes an interior wall that is connected to the air outlet port and extends so as to guide the traveling wind to the area below the vehicle body, and the heat exchanger is positioned so as to overlap the air outlet port when viewed in a direction parallel to a direction in which the interior wall extends.

8. The vehicle according to claim 6, wherein
the heat exchanger is a radiator, and
the wind guiding duct includes an interior wall that is connected to the air outlet port and extends so as to guide the traveling wind to the area below the vehicle body, and the heat exchanger is fixed in orientation so as to intersect a direction in which the interior wall extends.

9. The vehicle according to claim 6, wherein
the heat exchanger is an oil cooler, and
the wind guiding duct includes an interior wall that is connected to the air outlet port and extends so as to guide the traveling wind to the area below the vehicle body, and the heat exchanger is fixed in orientation so as to intersect a direction in which the interior wall extends.

10. The vehicle according to claim 6, wherein
the heat exchanger is a heat sink, and
the wind guiding duct includes an interior wall that is connected to the air outlet port and extends so as to guide the traveling wind to the area below the vehicle body, and the heat exchanger is fixed in orientation so as to be parallel to a direction in which the interior wall extends.

11. The vehicle according to claim 1, further comprising:
a second heat pipe that is installed so as to extend in an up-and-down direction of the vehicle body and is connected to the battery; and
a second heat sink that is provided on an upper surface of the battery and is connected to the second heat pipe,
wherein the wind guiding duct is provided so as to guide the traveling wind to the second heat sink.

* * * * *